SELECTABLE WORD LENGTH BUFFER STORAGE SYSTEM

Filed April 28, 1961 4 Sheets-Sheet 1

INVENTOR
MERWIN KLIMAN
BY
[signature]
ATTORNEY

Jan. 18, 1966 M. KLIMAN 3,230,514

SELECTABLE WORD LENGTH BUFFER STORAGE SYSTEM

Filed April 28, 1961

4 Sheets-Sheet 2

INVENTOR
MERWIN KLIMAN
BY
[signature]
ATTORNEY

INVENTOR
MERWIN KLIMAN
BY
[signature]
ATTORNEY

INVENTOR
MERWIN KLIMAN
BY
[signature]
ATTORNEY 3,230,514
Patented Jan. 18, 1966

3,230,514

SELECTABLE WORD LENGTH BUFFER STORAGE SYSTEM

Merwin Kliman, Glen Head, N.Y., assignor to Sperry Rand Corporation, Great Neck, N.Y., a corporation of Delaware Filed Apr. 28, 1961, Ser. No. 106,269
7 Claims. (Cl. 340—172.5)

This invention relates to digital storage systems involving cyclically moving storage devices and, more particularly, to magnetic drum storage systems. A more particular aspect of the invention is directed to a buffer register and cooperating control circuits which accommodate the transfer of selectable length word data between a magnetic drum and a data processing system.

In accordance with a preferred embodiment of the invention, a buffer shift register having a selectable length but fixed maximum numercial capacity is provided between a magnetic storage drum and a data processing system. In a first mode of operation binary signal data supplied by the processing system is first stored in the buffer register and then transferred to the drum. In another mode, binary signal data on the drum is first applied to the buffer register and then transferred to the processing system. In either mode, the buffer register is automatically cleared during the data transference to and from the drum by a fixed number of shift pulses derived from the drum. Provision is made for the interchange of binary word data between the drum and processing system of binary words of selectable length. The interchange is accomplished through the use of a minimum of control circuits which adapt the same buffer register for operation in both modes irrespective of word length.

It is an object of the present invention to provide a novel buffer storage arrangement permitting more efficient use of the storage space along a cyclically movable storage medium.

Another object is to provide a cyclically movable data storage system with a novel intermediate buffer register coupled between said cyclically movable storage system and a data processing system.

Figure 1:
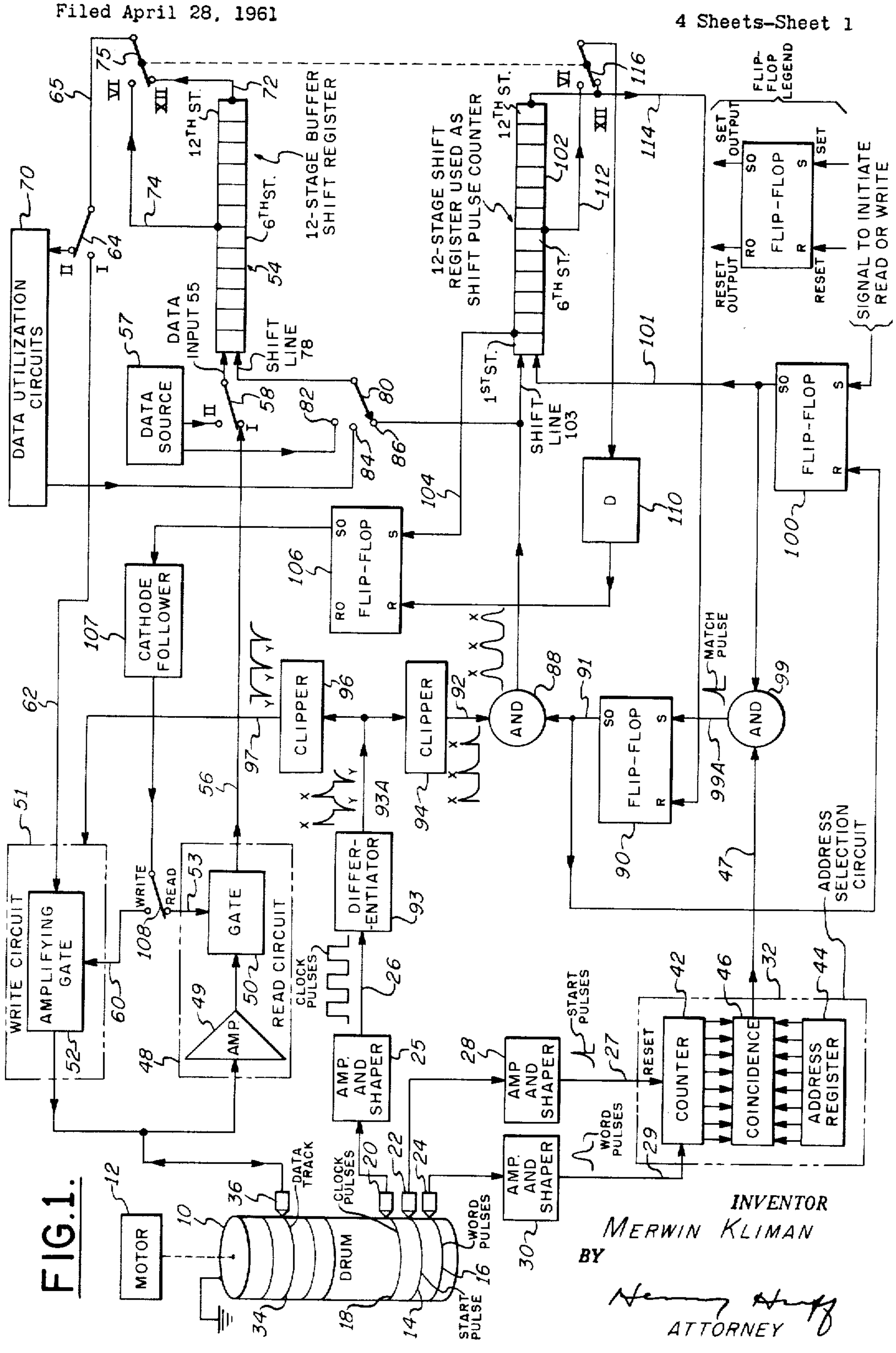
FIG. 1 is a block diagram of a magnetic drum storage system incorporating a preferred embodiment of the invention.

As seen in FIG. 1, the system includes a magnetic storage drum 10 driven by motor 12. Magnetic storage drums and transducers associated therewith are well-known and extensive description is unnecessary. However, in passing, it may be said that magnetitc storage drums are usually made of aluminum or brass cylinders with a thin magnetic surface formed, for example, by coating the drum surface with iron oxide or nickle. Information recorded as magnetic variations of the drum surface are distributed around the drum in what are commonly known as "tracks" which are scanned by electromagnetic transducers disposed in transducing relation with the tracks. "Transducing relation" refers to the operative position of a transducer between two systems in which it is effective to "transduce" (transfer, transform or translate) information or energy between two systems.

In the example shown, three tracks 14, 16 and 18 of the drum contain fixed patterns of pulses which are used for timing purposes. Track 14 contains a single pulse referred to as a start pulse. Track 16 contains 200 equally spaced word pulses, and track 18 contains 1200 equally spaced clock pulses. Such timing pulses may be recorded as magnetized spots along the particular drum tracks, or by any other suitable recording technique such as forming interruptions in the magnetic surface by etching or coating. The general nature of such recording techniques and the transducer required for information transfer to and from the storage drum for any particular type of recording are well known. Suitable electromagnetic reading heads 20, 22 and 24, translate the recorded timing pulses into electrical pulses which are amplified and shaped for uses hereinafter described. In particular, the clock pulses read by the reading head 20 from track 18 are supplied to an amplifier and shaping circuit 25 to provide, on a line 26, square wave clock pulses having the same repetition rate as the pulses recorded at track 18. Reading heads 22 and 24, associated respectively with tracks 14 and 16, are respectively coupled to the inputs of amplifying and shaping circuits 28 and 30 to provide, on lines 27 and 29, start and word pulses suitably shaped to operate an address selection circuit 32.

Drum 10 also carries a data storage track 34 associated with an adjacent electromagnetic transducer 36 for reading and writing information on the data track by spot magnetization. The system is arranged to provide 1200 equally spaced information positions or cells around track 34 corresponding to the number of clock pulses recorded on track 18. "Information positions or cells" may for convenience be referred to as "bit positions." For each clock pulse position on track 18 there is a corresponding bit position on track 34 so that as the drum rotates and the clock pulse and bit positions sequentially pass their respective associated transducer heads, corresponding bit and clock pulse positions will be indexed at the same time under their respective associated transducers. Thus, as each clock pulse position is indexed with the reader 20, the corresponding bit position will be indexed with the transducer 36. From the above it is readily seen that the repetition rate of the bit positions is the same as that of the clock pulses.

Figure 2:
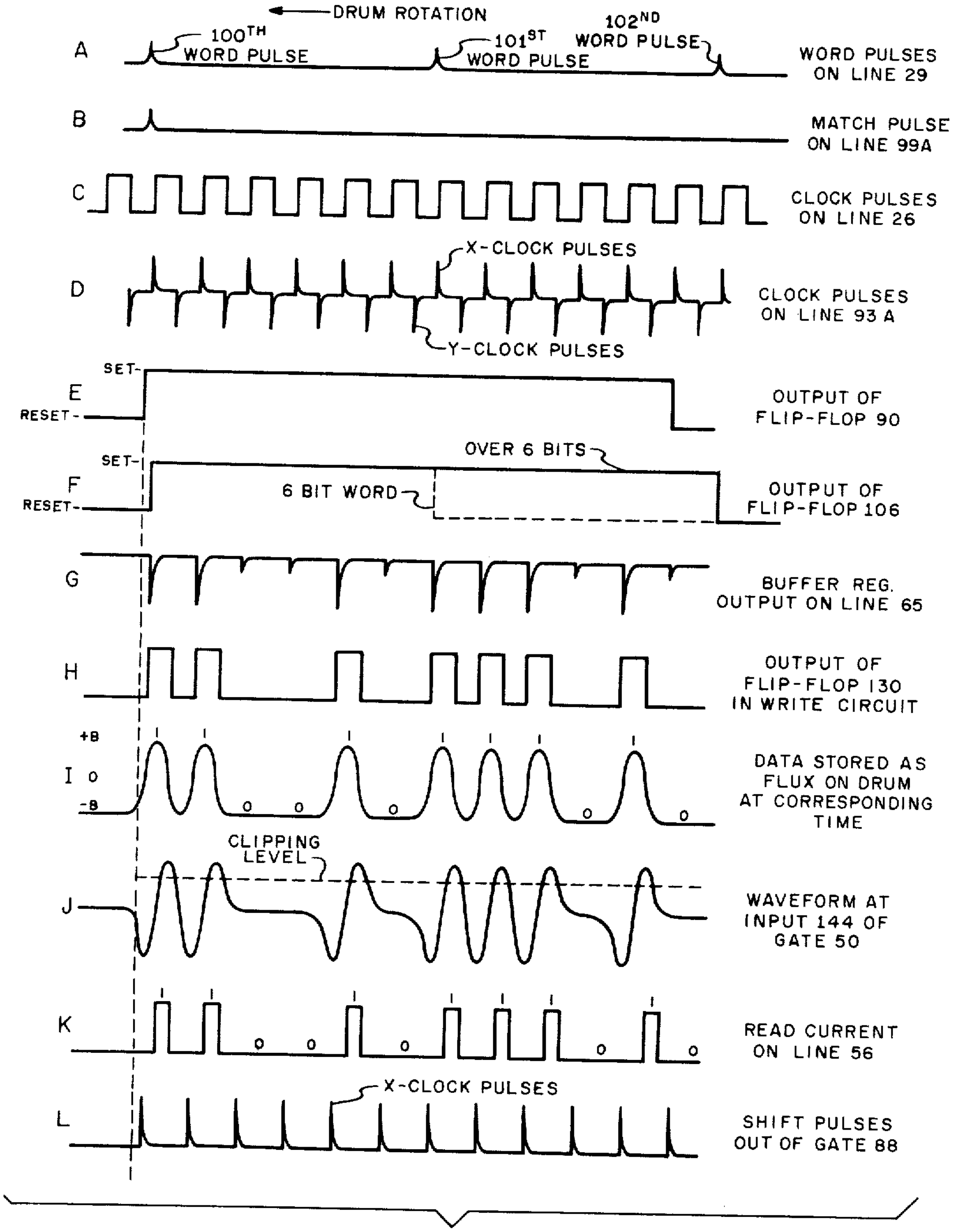
FIG. 2 is a graph showing a series of curves representing waveforms at the indicated circuit points.

Curves A and C of FIG. 2 illustrate the relative timing of the word and clock pulses derived from tracks 16 and 18 and occurring on lines 29 and 26, respectively. From FIG. 2, it will be apparent that there are 6 clock pulses between adjacent word pulses. Since there is a corresponding bit position on track 34 for each clock pulse, there are 6 bit positions between adjacent word pulses. Thus, track 34 has room for 200 6-bit words.

The start and word pulses generated in the reading heads 22 and 24 are supplied via lines 27 and 29 to the address selection circuit 32 which provides an output signal when any selected one of the word pulse positions is indexed with the reading head 24, thus heralding the arrival of the beginning of a partciular one of the 6-bit sectors of the data track 34 at the transducer 36. The address of any particular 6-bit word sector on track 34 is the numerical position of the immediately preceding word pulse with respect to the start pulse. For example, if the word pulse immediately preceding a particular 6-bit sector is the 20th word pulse after a start pulse, then the address of the particular word sector is 20.

Included in the address selection circuit 32 are a counter 42, an address register 44, and a coincidence circuit 46 which provides an output signal on line 47 when the address in the register 44 corresponds to the count in the counter 42. The counter should have a capacity at least equal to the total number of word pulses on track 16, in this particular case 200. The counter 42 may, for example, be an eight stage binary counter having a capacity of $2^8=256$. The output of the eight stages of the counter is passed in parallel form to the coincidence circuit 46 which compares the eight stages of the counter to eight corresponding binary stages of the address register 44, which hold in parallel form the number representing the desired address. When the output of each stage of the counter coincides with the output of each stage of the register, a signal is provided on line 47. The coincidence signal on line 47 may be referred to as an address selection signal. The counter is reset to 0 in response to each start pulse received over line 27 from the drum. Thus, the counter is reset after each drum revolution.

Figure 6:
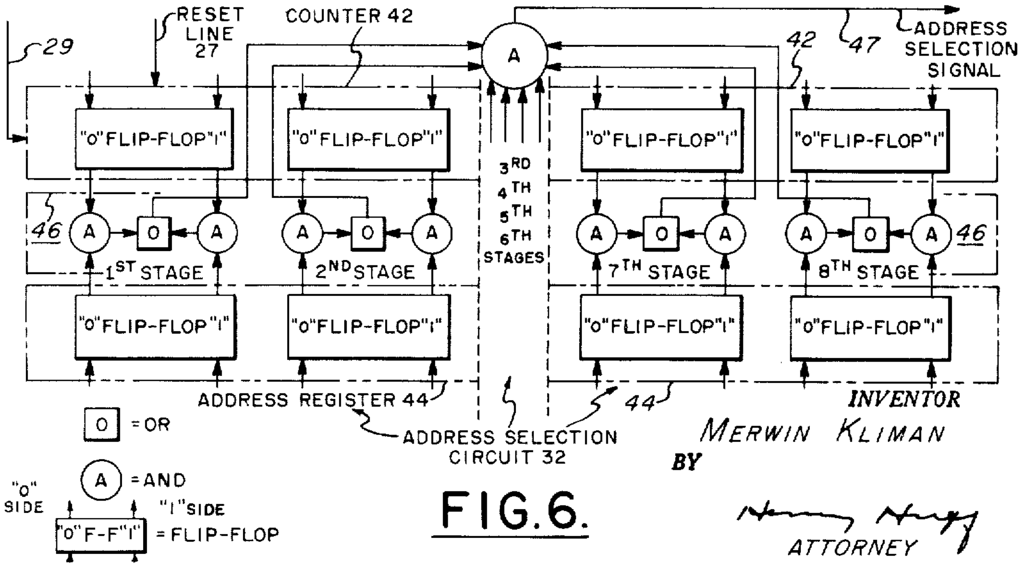
FIG. 6 is a simplified diagram of the address selection circuit in FIG. 1.

Any given word sector is "located" by entering in the register 44, the number representing the address of the desired word sector. The process of locating a desired sector is referred to as addressing the drum. The desired sector is located when the coincidence circuit produces an output in response to agreement between the count in the counter and the address number in the register, at which time the beginning of the desired word sector will be indexed with the reading head 36. The address selection circuit 32 is shown in some detail in FIG. 6 from which the operation is readily evident. The standard connections between the individual binary stages in the counter 42 and to the binary stages in the address register are not shown for the sake of simplicity and clarity. It may be noted that connections are shown only to the 1st, 2nd, 7th and 8th stages, the connections to the 3rd, 4th, 5th and 6th stages being the same. This and other address selection arrangements are well known and any suitable arrangement which will provide an address location signal on line 47 when the drum is addressed may be employed.

Transducer 36, which is employed for both reading and writing, is coupled to the input of a reading circuit 48 including an amplifier 49 and a gate 50, and to the output of a writing circuit 51 including an amplifier gate 52. The function of the read circuit 48, when enabled by a signal on an input line 53 to gate 50, is to transfer data from drum track 34 to a buffer shift register 54, whose data input line 55 is connectable to either the output line 56 of gate 50 or to the output of a data source 57 by means of a switch 58. Shift register 54 may be a magnetic 1-core-per-bit register of the type shown in FIG. 3, and hereinafter described.

The function of the write circuit 51, when enabled by a signal on an input line 60 to gate 52, is to pass data from the register 54 to the drum track 34, the data from the register being applied to the gate over an input line 62 connectable by a switch 64 to the output line 65 of the register 54. One end of the register output line 65 is selectively connectable to either the input line 62 of gate 52 or a data utilization circuit 70 by means of a switch 64. The other end of the register output line 65 is selectively connectable to either the output 72 of the full register of the output 74 of a shorter length of the register by means of a switch 75. In the example shown, the register has 12 bi-stable stages, output 72 being taken from the 12th stage and output 74 being taken from the 6th stage.

Data stored in register 54 is shifted from stage to stage in response to shift pulses received on the register shift line 78. Shift pulses are received on line 78 from any one of three sources depending on the position of a three-way switch 80. A tap 82 of the switch is connected to the source of data pulses 57. Another tap 84 is connected to the data utilization circuit 70. The third tap 86 is connected to the output of a two input AND gate 88, which on one input receives a differentiated version of the leading edge of the square wave clock pulses. Another input of the AND gate 88 is connected to the "set" output terminal of a flip flop 90. An AND gate is a well known circuit with a single output and two or more input leads so designed that an output signal is produced when and only when input signals are received at all the input leads. It is well known that flip flops have two stable states. These states may be arbitrarily designated set and reset. Thus, when a flip flop is set (in the set state), an output is produced at the set output terminal, and when it is reset (in the reset state), the output switches to the reset output terminal. A flip flop is set by a signal applied to its set input terminal, and reset by applying a signal to the reset input terminal.

The differentiated pulses are supplied to one input of the AND gate 88 over a line 92 by means of an arrangement including a differentiator 93 having its input connected to the output of the amplifier and shaper circuits 25 and its output (curve D of FIG. 2) passed through a clipper 94 to provide the differentiated leading edges of the clock pulses. The output of the differentiator 93 is also passed through a clipper 96 to provide, on a line 97, a differentiated version of the trailing edges of the clock pulse waves which are supplied to the write circuit 51 for a purpose later described. The pulses on line 92 may be referred to as the X-clock pulses, while those on line 97 may be referred to as the Y-clock pulses. The repetition rate of each is the same as that of the pulses on line 26.

The X-clock pulses from clipper 94 are passed through the AND gate 88 when it is opened in response to an input signal over line 91. The input signal occurs when flip flop 90 is set in response to a signal at its set input terminal, which is connected to the output of a two input AND gate 99. One input of the latter gate is connected to the ouput of the coincidence circuit 46 while another input to the gate is connected to the set output terminal of a flip flop 100. AND gate 99 produces an output only when it receives an address selection signal from coincidence circuit 46 while flip flop 100 is in the set condition. The set output terminal of flip flop 90 is connected to the reset input terminal of flip flop 100.

The set output terminal of flip flop 100 is also connected to the data input line 101 of a 12-stage shifting register 102 employed to count the shift pulses from AND gate 88 applied to register 54.

Figure 3:
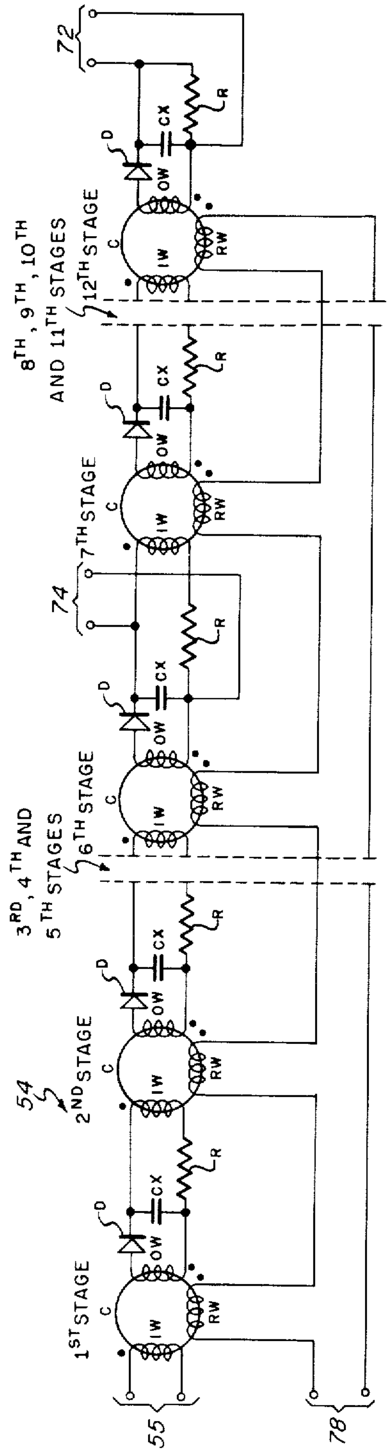
FIG. 3 is a diagram of a buffer shift register suitable for use in the system of FIG. 1.
Figure 4:
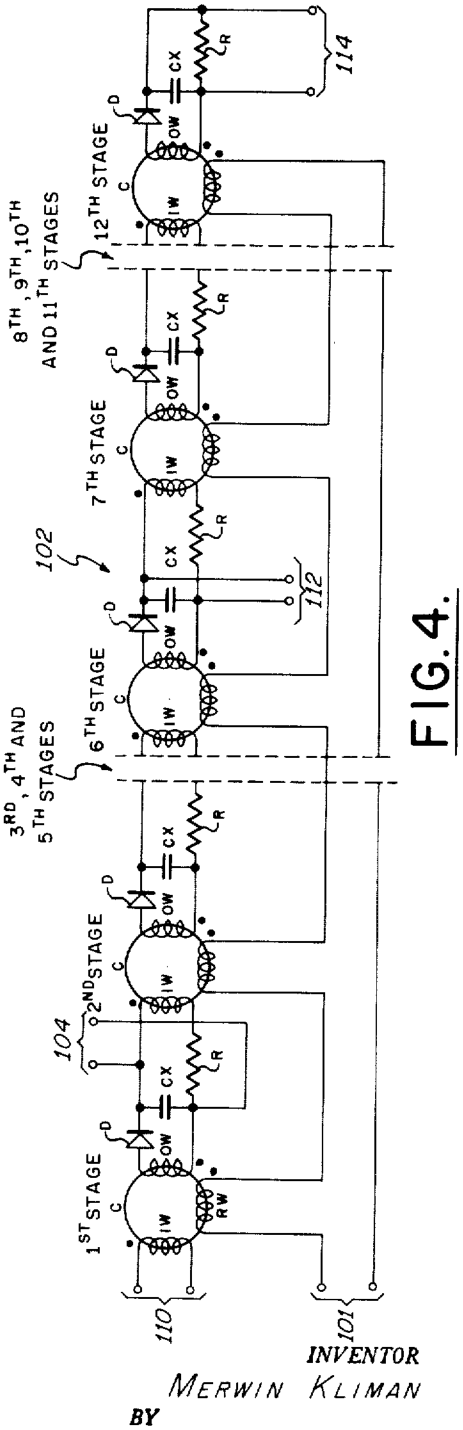
FIG. 4 is a diagram of a shift register suitable for use as the shift pulse counter in the system of FIG. 1.

FIG. 4 illustrates one example of a shift register which may be employed at 102 to keep track of the clock pulses applied as shift pulses to the register 54. This is similar to that shown in FIG. 3 and will be described later. The shift line 103 of register 102 is connected to the output of AND gate 88. In addition to being coupled to the second stage, the output of the first stage of register 102 is connected through a line 104 to the set input terminal of a flip flop 106 whose set output terminal is connected to either input line 53 of gate 50 or input line 60 of gate 52, depending on the position of a switch 108. The reset input terminal of flip flop 106 is connectable through a delay 110 to either the 6th stage output 112 of register 102 or its 12th stage output 114 by means of switch 116, which is ganged with switch 75 to be operated synchronously therewith.

In one aspect of its operation the system of FIG. 1 transfers data which is in the buffer register 54 to a designated address on track 34 of the drum 10. In another aspect, the system operates to retrieve data from a designated address on track 34 and transfer it to the buffer register. Circuits 57 and 70 generally represent pertinent portions of a data processing system which are also operatively associated with the buffer register. Data source 57 and data utilization circuits 70 respectively supply data to and receive data from the buffer register at times not necessarily coherent with the rotation of drum 10. The overall function of the system of FIG. 1 is to provide for the transference of data between the drum and the data processing system via the intermediary of the buffer register. The specific identity of the source 57 and the utilization circuits 70 is not material to the present invention.

The operation of reading of data from the drum to the buffer register preliminary to its transference to the data processing system will now be considered. The reading operation will be described first as it applies to reading out of drum track 34, an extended word having 12 bits. For this operation, switch 108 is at the read position, switch 58 is at its I position, switch 80 is at tap 86, and switches 75 and 116 are at their XII positions. In the circuit of FIG. 1, the switches are set in the particular positions just described. All flip flops are initially in the reset state.

Assume for example that the 12-bit word 110010111010 is stored on track 34 and occupies the 12-bit positions of two adjacent 6-bit sectors (curve I, FIG. 2). The address employed will be that of the leading (in the direction of drum revolution) one of the two sectors. For example, if the word pulse at the beginning of one 6-bit sector is the 100th word pulse after the start pulse (curve A, FIG. 2), and the word pulse at the beginning of the adjacent sector is the 101st word pulse, then the address of a word occupying the two adjacent sectors is 100. To locate the 12-bit word whose address is 100, the number 100 is set into the address register 44. During each revolution of the drum, the counter 42, after being reset to zero by the start pulse, counts the consecutive word pulses. The coincidence circuit 46 continuously compares the output of the counter 42 to the number (100) in the register 44. Each time the count in the counter reaches 100, the coincidence circuit 46 produces an output pulse (address selection signal) on line 47 which is is applied to one input of AND gate 99.

In the meantime an initiating signal (from a source not shown) is applied to the set input terminal of flip flop 100, thereby setting the flip flop and providing an output at its set output terminal. The output is applied to the other input of AND gate 99 and to the data input line 101 of shift register 102 where it sets a 1 into the first stage of register 102. At the preselected word pulse time, an address selection pulse provided on line 47 by the address selection circuit 32 will open AND gate 99 long enough to form a "match" pulse on line 99A, curve B, FIG. 2) which in turn sets flip flop 90 (curve E, FIG. 2). In its set state, flip flop 90 opens AND gate 88 and also resets flip flop 100. The resetting of flip flop 100 causes AND gate 99 to close thereby preventing any more match pulses from occurring. The opened AND gate 88 passes X-clock pulses to the shift lines 78 and 103 of registers 54 and 102. The shifts occur at X-clock pulse time. As the 1st shift pulse transfers the 1 previously stored in the 1st stage of the clock pulse counter (register 102), from that stage to the second stage, the output of the 1st stage on line 104 sets flip flop 106 (curve F, FIG. 2). The resulting set output of this flip flop opens read gate 50, allowing the data bits of the selected word to be entered serially into register 54. From the above description, it is seen that gates 88 and 50 have been opened in response to the address selection signal transmitted from the coincidence circuit 46 to gate 99. As will be explained hereinafter, the drum data coming from the read circuit 48 and gate 50 is 90° out of phase with the shift pulses (X-clock pulses). Curve K shows the data signals derived from drum track 34 and applied to the data input line 55 of register 54 during the reading operation.

The position within the register 102 of the 1 which was originally set into the first stage is a direct indication of the number of shift pulses passed through gate 88 and applied to the shift lines of register 54 and 102. After 12 such pulses have occurred, an output is produced by the 12th stage of the clock pulse counter (register 102) which output resets flip flop 90 (curve E, FIG. 2) to close AND gate 88 in order to block any further shift pulses. Register 102 is automatically reset at the same time. The same 12th stage output, via switch 116, and after a delay, reset flip flop 106 (curve F, FIG. 2) to close the read gate 50 and prevent any further data transfer from drum track 34. Delay 110 is necessary to allow sufficient time for the 12th data digit to enter the first stage of shift register 54. At this time the selected word is in shift register 54, and all flip flops have been returned to their original reset state.

Reading of a 6-bit word is the same in all respects as the reading of a 12-bit word except that ganged switches 75 and 116 are operated to their VI positions. In the 6-bit mode, at the time of the 6th shift pulse passed by gate 88, when the 1 is being transferred from the 6th to the 7th stage, an output is produced on the 6th stage output line 112, which, via switch 116 and delay 110, resets flip flop 106 to close read gate 50. Gate 88 continues to pass shift pulses until counter 102 is reset and produces an output at 114 in response to the 12th shift pulse, which output resets flip flop 90 to close gate 88. The output at 114 is produced when the 1 in the 12th stage is being transferred out. Although gate 50 is closed after 6 shift pulses, register 54 is shifted 6 more times for a total of 12 times whereby the six-bit word is shifted to occupy the last six stages of register 54. In this position, the stored six-bit word is immediately available for transference via line 72 at a later time to the data processing system of which utilization circuits 70 is a part.

When it is required to transfer the information stored in register 54 to data utilization circuits 70, it is only necessary to move switch 80 to position 84 and to move switch 64 to position II. At the appropriate time, determined by the data requirements of circuits 70, a number of shift pulses are applied via contact 84 of switch 80 to the shift pulse line 78 of register 54. The shift pulses are generated within circuits 70 and are of a number equaling the number of bits of word of words stored in register 54. For example, 6 shift pulses are applied if a 6-bit word is stored; 12 shift pulses are applied for a 12-bit stored word. In either case switch 75 is at position XII. The data is shifted out via switch 75 and line 65 to circuits 70. It should be noted that register 54 is automatically reset by the last shift pulse derived from circuits 70. Register 102 is not used in this operation.

The inverse mode of operation, wherein the data is to be transferred from the data processing system to the drum via buffer register 54 will now be described. It is initially assumed that registers 54 and 102 are in their reset condition. A new word of either a 6-bit or a 12-bit length is supplied to contact II of switch 58 by data source 57. A corresponding number of shift pulses is applied by source 57 to contact 82 of switch 80. Accordingly, switch 58 is moved to position II and switch 80 is moved to position 82. It will be observed that a 6-bit word will occupy the first 6 stages of register 54 after the shifting operation is completed. Of course, if a 12-bit word instead is supplied by source 57, the word will occupy all 12 stages of register 54. Register 102 is not used in this operation.

The writing operation, i.e., the transference of data from register 54 to drum 10 is generally similar to the drum read-out operation previously described. Before the pulse is applied to the set terminal of flip flop 100 to initiate the writing operation, switch 108 is moved to the "write" position, switch 64 is moved to its I position, switch 80 is at position 86 and ganged switches 75 and 116 are moved to their VI or XII positions depending on whether a 6-bit or 12-bit word had been previously stored in register 54 for transference to the drum. Assuming, for example, that a 6-bit word had been stored in register 54, switches 75 and 116 are moved to their VI position.

The movement of switch 108 to the write position transfers the set output of flip flop 106 from the read gate 50 to the write gate 52. Thus, when flip flop 106 is finally energized as previously described for the read operation, it causes gate 52 to open leaving the read gate 50 closed. Gate 52 is closed after a delay determined by circuit 110 in response to either the 6th or 12th shift pulse on line 103 as determined by the setting of ganged switches 75 and 116. As before, gate 88 is closed in response to the 12th shift pulse of line 103 irrespective of the setting of the ganged switches 75 and 116. Curve G of FIG. 2 shows the output of register 54 during the write operation, assuming the same 12-bit word sample was used in the prior description of the reading operation.

During the write operation, the address selection and operation of all the flip flops is the same as in the reading operation except that during the write operation the clock pulses shift the information out of register 54 and into drum track 34 through the write circuit 51. It should be noted that a total of 12 shift pulses are applied to both registers 54 and 102 irrespective of whether a 6-bit or a 12-bit word is being transferred from register 54 to drum 10. Thus, both registers 54 and 102 are automatically reset upon completion of the data transference.

It will be appreciated by those skilled in the art that the buffer storage system of the present invention is readily adapted for operation with binary words of selectable length. For purposes of illustration only, the operation of the system has been described in terms of words of 6-bit and 12-bit lengths. Words of any other lengths may be accommodated merely by modifying the lengths and tap positions of registers 54 and 102. The equal lengths of registers 54 and 102 are determined by the maximum length word to be operated upon. The number of taps on each of registers 54 and 102 is determined by the number of smaller length words to be accommodated. The taps are located at positions corresponding to the lengths of said smaller words.

The specific example of shift register 54 shown in FIG. 3, is a well-known, one-core-per-bit-magnetic register, wherein each stage includes a rectangular hysteresis core C having an input winding IW, a reset winding RW, and an output winding OW connected across a capacitor CX through a diode D, the output being taken from across the capacitor through a current limiting resistor R. Input and output circuits of adjacent stages are coupled together and all the reset windings are coupled together to the shift line 78 connected to the output of gate 88. The data input line 55 is coupled to the input winding IW of the 1st stage. The output line 74 is coupled to the output circuit of the 6th stage, and the output line 72 is coupled to the output circuit of the 12th stage. The operation is as follows:

Winding directions are indicated by dots and assume that a current into a dotted end sets the core into positive saturation representing for example binary 1. Binary 0 is then represented by negative saturation. When a shift pulse is applied to the shift line 78, all cores are reset to negative saturation (Binary 0). Any core that initially stored a binary 1 will generate a voltage across its output winding OW as the core is reset to binary 0. A current due to this voltage charges the capacitor CX through the diode D, and after the shift pulse, any capacitor which has been charged, will now discharge into the input winding IW of the next stage thus storing a binary 1 in the latter stage. A core that initially has stored a binary 0 does not charge the capacitor, and the next stage will remain with the binary 0 stored therein by the shift pulse. After each shift pulse, each magnetic core is left in the state of the previous core. The stored data is thus advanced one stage in response to each shift pulse on line 78.

The example of register 102 illustrated in FIG. 4 is of the same type as that shown in FIG. 3, and operates in the same general manner. An additional output is taken from the 1st stage at 104 for connection to the set input terminal of flip flop 106. The other input and output lines to register 102 shown in FIG. 1 are also indicated in FIG. 4.

It should be understood that although register 102 is a shift register its function in the circuit is that of a counter to count the shift pulses gated through gate 88 and applied to register 60. Thus, any suitable counter which provides outputs in response to the 6th and 12th shift pulses may be employed at 102. It should also be understood that employment of 6-bit word sectors, 12 stage registers and corresponding counters are by way of example only, and any number of bits per sector may be employed with proper length registers and counter capacities.

Figure 5:
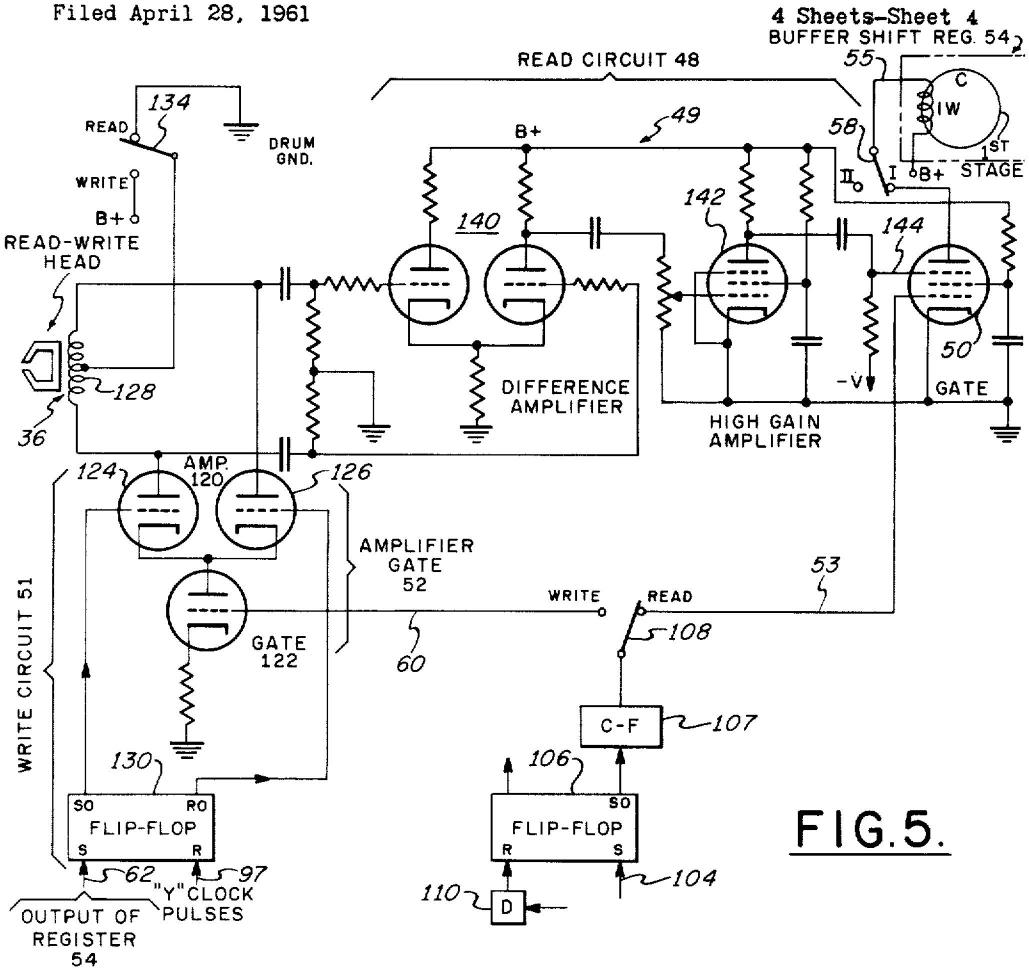
FIG. 5 is a diagram of the read and write circuits employed in the system of FIG. 1.

As detailed in FIG. 5, the amplifier gate 52 of the write circuit 51 includes an amplifier section 120 and a gate section 122. The amplifier section 120 includes two tubes 124 and 126 whose outputs are coupled to opposite ends of the winding 128 of the read-write head 36. The inputs of the tubes 124 and 126 are respectively connected to the set and reset output terminals of a flip flop 130 whose set input terminal is connected over line 62 to the output line 65 of register 54, and whose reset input terminal is connected to receive the Y-clock pulses over line 97.

The control input to gate section 122 is connectable over an input line 60, and through switch 108 (in its write position) to the output of cathode follower 107 whose input is connected to the set output of flip flop 106.

During the write operation, a switch 134 connects a source of B+ to the center tap of transducer winding 128, and gate section 122 is opened (rendered conductive) in response to the set output signal from flip-flop 106. As the data is shifted out of the buffer register 54 onto line 62, binary 1's will at X-clock times set flip-flop 130 which is reset every Y-clock time by the Y-clock pulses received on line 97. Curve G, FIG. 2, shows the waveform of the data on the register output line 65 and applied through line 62 to the set side of flip flop 130. The resultant states of flip flop 130 are shown in curve H. The occurrence of a binary 1 in the data causes flip flop 130 to stay in its set state for half that bit period, while the occurrence of a binary 0 merely allows the flip flop to remain in its reset state. The set and reset outputs of flip flop 130 are fed to the inputs of the respective amplifier tubes 124 and 126 to produce an output current waveform in the transducer 36 very similar to waveform H, FIG. 2. Waveform I represents the resultant flux which occurs along the data track on the drum 10, and which is a result of adjusting such parameters as surface speed, writing current, and gap spacing to provide the necessary correlation for obtaining such a waveform. Binary 1 is recorded by positive saturation during the first half bit interval while binary 0 is recorded by negative saturation during the entire interval. The use of negative or positive saturation current at all times results in a very low noise level on the drum.

In the reading circuit 48 as detailed in FIG. 5, the inputs of a difference amplifier 140 are coupled to the transducer winding 128, whose center tap is connected to the drum ground by means of switch 134 during the read operation.

The difference amplifier 140 insures low noise level by cancelling out noise originating from common mode signals or from pick-up in the transducer. The output of amplifier 140 is fed through a high gain amplifier 142 to an input 144 of gate 50. Gate 50 in the illustrative embodiment is a vacuum tube set for class C operation when switch 108 is in the read position. The appropriate bias is developed at the cathode follower (107) output when flip flop 106 is in its set state. Otherwise gate 50 is held cut off as when switch 108 is in the write position or when flip-flop 106 is in the reset state. The output of amplifier 142 as fed to the input 144 (suppressor grid) of the gate 50 tube is shown in waveform J, (FIG. 2).

The class C operation of gate 50 provides noise clipping action, the clipping level being shown superimposed on the waveform shown at J, (FIG. 2). Waveform K in FIG. 2 shows the current pulses generated in the gate 50 tube, which is also the current that passes through the input winding IW of the first stage core in the buffer shift register 54. Further noise rejection is accomplished at this point since the core will only be switched when the integral of the current pulse exceeds some minimum threshold. From waveform K (FIG. 2) it may be noted that the read circuit output applied over line 56 to the data input 55 of shift register 54 is shifted in time with respect to the shift pulses and that this result is accomplished without delaying any signals or without resorting to sampling from the drum.

It will be appreciated that the read and write circuits shown in FIG. 5 are exemplary and that any suitable read and write circuits may be employed in the system of FIG. 1.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A buffer storage system accommodating data represented by binary words of selectable length, each word comprising a series of regularly occurring binary signals, said storage system comprising a source of said binary signals, a source of shift pulses having the same occurrence rate as that of said binary signals, a shift register, a pulse counter, first actuable means for selectively applying solely when actuated said shift pulses to both said register and said counter, second actuable means for selectively interconnecting solely when actuated said binary signal source and said register, means for jointly actuating both said actuable means, said counter producing a first de-actuating signal when its full numerical capacity is reached and producing a second de-actuating signal when a predetermined number less than said numerical capacity is reached, means for applying said first de-actuating signal to said first actuable means, and switching means for selecting one of said first and second de-actuating signals and applying the selected signal to said second actuable means.

2. A buffer storage system accommodating data represented by binary words of selectable length, each word comprising a series of regularly occurring binary signals, said storage system comprising a source of said binary signals, a source of shift pulses having the same occurrence rate as that of said binary signals, a shift register, a pulse counter, first actuable means for selectively applying solely when actuated said shift pulses to both said register and said counter, second actuable means for selectively interconnecting solely when actuated said binary signal source and said register, means for jointly actuating both said actuable means, said counter producing a first de-actuating signal when its full numerical capacity is reached and producing a second de-actuating signal when a predetermined number less than said numerical capacity is reached, means for applying said first de-actuating signal to said first actuable means, and means for applying said second de-actuating signal to said second actuable means.

3. A buffer storage system accommodating data represented by binary words of selectable length, each word comprising a series of regularly occurring binary signals, said storage system comprising a source of said binary signals, a source of shift pulses having the same occurrence rate as that of said binary signals, a shift register, a pulse counter, first actuable means for selectively applying solely when actuated said shift pulses to both said register and said counter, second actuable means for selectively applying solely when actuated said binary signals to said register, means for jointly actuating both said actuable means, said counter producing a first deactuating signal when its full numerical capacity is reached and producing a second deactuating signal when a predetermined number less than said numerical capacity is reached, means for applying said first deactuating signal to said first actuable means, and means for applying said second deactuating signal to said second actuable means.

4. A buffer storage system accommodating data represented by binary words of selectable length, each word comprising a series of regularly occurring binary signals, said storage system comprising a source of said binary signals, a source of shift pulses having the same occurrence rate as that of said signals, a multiple stage shift register having a first output at one stage and a second output at another stage, a pulse counter having a first output at one stage corresponding to said one stage of said shift register and having a second output at another stage corresponding to said another stage of said register, first actuable means for selectively applying solely when actuated said shift pulses to both said register and said counter, first switching means for selecting one of said first and second outputs of said register, second actuable means for selectively interconnecting solely when actuated said binary signal source and the selected output of said register, means for jointly actuating both said actuable means, said counter producing a first deactuating signal at its first output and producing a second deactuating signal at its second output, means for applying said first deactuating signal to said first actuable means, and second switching means for selecting one of said first and second deactuating signals and applying the selected signal to said second actuable means.

5. A buffer storage system accommodating the transfer of data between a magnetic drum and a data processing system, said data being represented by binary words of selectable length, each word comprising a series of regularly occurring binary signals, said storage system comprising a magnetic drum including a source of said binary signals and a source of shift pulses having the same occurrence rate as that of said binary signals, a shift register, a pulse counter, first actuable means for selectively applying solely when actuated said shift pulses to both said register and said counter, second actuable means for selectively interconnecting solely when actuated said drum and said register, means for jointly actuating both said actuable means, said counter producing a first deactuating signal when its full numerical capacity is reached and producing a second deactuating signal when a predetermined number less than said numerical capacity is reached, means for applying said first deactuating signal to said first actuable means, and switching means for selecting one of said first and second deactuating signals and applying the selected signal to said second actuable means.

6. A buffer storage system accommodating the transfer of data between a rotating magnetic drum and a data processing system, said data being represented by binary words of selectable length, each word comprising a series of regularly occurring binary signals, said storage system comprising a rotating magnetic drum including a source of said binary signals and a source of shift pulses having the same occurrence rate as that of said binary signals, a shift register, a pulse counter, first actuable means for selectively applying solely when actuated said shift pulses to both said register and said counter, second actuable means for selectively applying solely when actuated said signals to said register, means for jointly actuating both said actuable means when said rotating drum is in a predetermined position, said counter producing a first deactuating signal when its full numerical capacity is reached and producing a second deactuating signal when a predetermined number less than said numerical capacity is reached, means for applying said first deactuating signal to said first actuable means, and means for applying said second deactuating signal to said second actuable means.

7. A buffer storage system accommodating the transfer of data between a rotating magnetic drum and a data processing system, said data being represented by binary words of selectable length, each word comprising a series of regularly occurring binary signals, said storage system comprising a rotating magnetic drum including a source of said binary signals and a source of shift pulses having the same occurrence rate as that of said binary signals, a multiple stage shift register having a first output at one stage and a second output at another stage, a pulse counter having a first output at one stage corresponding to said one stage of said shift register and having a second output at another stage corresponding to said another stage of said register, first actuable means for selectively applying solely when actuated said shift pulses to both said register and said counter, second actuable means for selectively applying solely when actuated said signals to said register, means for jointly actuating both said actuable means when said rotating drum is in a predetermined position, said counter producing a first deactuating signal at its first output and producing a second deactuating signal at its second output, means for applying said first deactuating signal to said first actuable means, and switching means for selecting one of said first and second deactuating signals and applying the selected signal to said second actuable means.

References Cited by the Examiner

UNITED STATES PATENTS

| | | | |
|---|---|---|---|
| 2,896,848 | 7/1959 | Miehle | 235—92 |
| 2,956,745 | 10/1960 | Cromleigh | 235—132 |
| 3,037,194 | 5/1962 | Dirks | 340—172.5 |

ROBERT C. BAILEY, *Primary Examiner.*

DARYL W. COOK, *Examiner.*